A. LATHAM.
TRIMMING MACHINE.
APPLICATION FILED JUNE 30, 1909.
1,011,451. Patented Dec. 12, 1911.
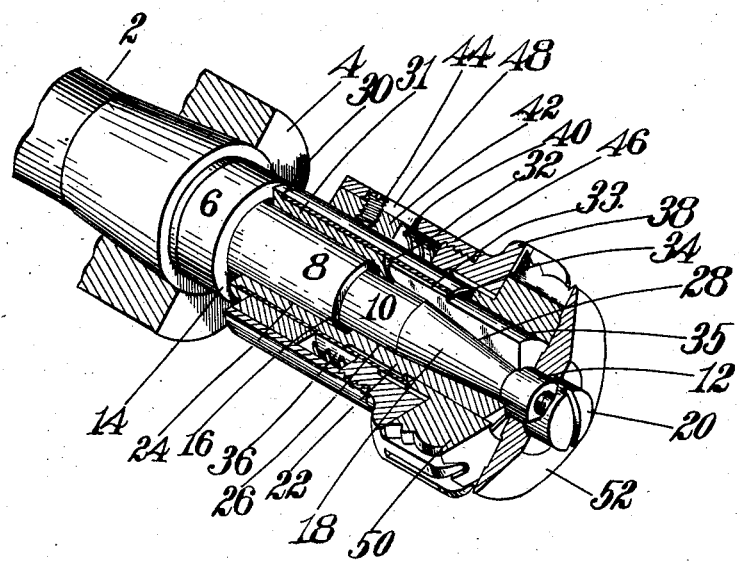
WITNESSES.
Elizabeth C. Coupe
Edith C. Holbrook
INVENTOR.
Albert Latham
By his Attorney,
Nelson W. Howard

UNITED STATES PATENT OFFICE.

ALBERT LATHAM, OF BEVERLY, MASSACHUSETTS, ASSIGNOR TO UNITED SHOE MACHINERY COMPANY, OF PATERSON, NEW JERSEY, A CORPORATION OF NEW JERSEY.

TRIMMING-MACHINE.

1,011,451.     Specification of Letters Patent.     Patented Dec. 12, 1911.

Application filed June 30, 1909. Serial No. 505,205.

*To all whom it may concern:*

Be it known that I, ALBERT LATHAM, a citizen of the United States, residing at Beverly, in the county of Essex and State of Massachusetts, have invented certain Improvements in Trimming - Machines, of which the following description, in connection with the accompanying drawings, is a specification, like reference characters on the drawings indicating like parts in the several figures.

This invention relates to trimming machines and particularly to that type of sole trimming machines in which the cutter is mounted on a shaft for rapid rotation and coöperates with a yielding feather-edger to trim the edge of a shoe held against the cutter.

The principal object of the invention is to provide an improved mechanism for assembling and centering the cutter and feather-edger on the shaft.

The invention also has for an object the improvement of the cutter head which forms the subject matter of the United States Patent No. 572,878, December 8, 1896. In the practical operation of the device disclosed in said patent it has been found that the expansible clamping sleeve is frequently expanded back of the cutter and binds against the feather-edger, thus interfering with that freedom of movement of the latter necessary to proper operation.

The present invention aims, among other things to overcome the objection just noted and to this end provides a support for the feather-edger on which the latter slides freely and which support is mounted on the clamping sleeve, but is spaced from the expanding portion thereof, whereby all possibility of the binding action referred to is obviated.

The invention also comprises certain novel features of construction and operation which will be hereinafter more fully described and for which protection will be sought in the appended claims.

The figure of the accompanying drawing is a view in perspective of a cutter head constructed according to the present invention with certain of the parts partially cut away.

Referring to the drawing, 2 designates a shaft mounted in suitable bearings for rapid rotation, a portion of one of the bearings being shown at 4. Forward of the bearing the shaft is provided exteriorly with a series of cylindrical surfaces 6, 8, 10 and 12, decreasing in diameter as they progress forwardly, the adjacent surfaces 6, 8 and 10 being separated by shoulders 14 and 16. That portion of the shaft between the cylindrical surfaces 10 and 12 has a tapered or frusto-conical surface 18 and the forward end of the shaft is drilled and tapped to receive a clamping bolt 20. Mounted on the shaft is an expansible clamping sleeve 22 having interior cylindrical surfaces 24 and 26 coöperating respectively with the surfaces 8 and 10 of the shaft, and a tapered bore 28 fitting the tapered portion of the shaft. The forward end of the clamping sleeve is slitted to provide a plurality of flexible sections. Exteriorly the sleeve is provided with a series of shoulders 30, 32 and 34, decreasing in diameter as they progress forwardly, and a series of cylindrical surfaces 31, 33 and 35. An outer sleeve 36, fitted closely onto the surface 31 of the clamping sleeve, abuts against the shoulder 30 and extends forward to a point just in front of the shoulder 34. This outer sleeve serves as a support for the feather-edger 38 which fits snugly but slidably thereon and is yieldingly held in its forward position by a helical spring 40 bearing against a ring 42, also fitting on the sleeve 36, and held in adjusted position by the set screw 44. The range of movement of the feather-edger is limited by a sleeve 46 screw threaded onto the rear portion of the feather-edger and sliding freely on the ring 42, the sleeve having a slot 48 through which the set screw 44 projects. It will be noted that the sleeve 46 incloses the spring 40 and provides a smooth exterior surface free from projections liable to strike and injure the hands of the operator. The cutter head 50, which may be of any desired construction, is mounted on the expansible portion of the clamping sleeve and abuts against the forward end of the sleeve 36. A vamp guard 52, positioned on the end of the shaft, bears against the cutter head and interlocks with the blades of the latter. The blades of the feather-edger are received between the blades of the cutter in the usual manner.

With the parts in the positions shown in the figure, it will be clear that as the clamping bolt 20 is turned in against the guard 52 the cutter 50 will be forced inwardly, and its motion will be transmitted by the sleeve 36 to the clamping sleeve 22 the thrust of the cutter being transmitted through the sleeve 36 solely to the cylindrical portion of the clamping sleeve. As the sleeve 22 is carried backwardly along the tapered portion 18 of the shaft its forward portion will be expanded and the shaft, clamping sleeve and cutter will be rigidly clamped together. The clearance space between the sleeve 36 and the surface 33 of the clamping sleeve provides ample room for the expansion of the latter and avoids all possibility of the clamping sleeve interfering with the freedom of movement of the feather-edger.

Having described my invention, what I claim as new and desire to secure by Letters Patent of the United States is:

1. A machine of the class described, having in combination, a shaft provided with a tapered portion, an expansible clamping sleeve positioned on said shaft and having a tapered bore fitting the tapered portion of the shaft, a cutter received on said sleeve, a feather-edger, and a support for the feather-edger fitted closely on to a portion of said clamping sleeve, but spaced from the expansible portion thereof.

2. A machine of the class described, comprising in combination, a shaft having a tapered portion and a cylindrical portion, a cutter-supporting sleeve having an expansible portion fitting over the tapered portion of said shaft, and a cylindrical portion fitting over the cylindrical portion of said shaft, a cutter mounted on the expansible portion of the sleeve, means for moving the cutter axially of the shaft, and means independent of said cutter and sleeve for transmitting the thrust of the cutter solely to the cylindrical portion of said sleeve.

3. A machine of the class described having, in combination, a shaft provided with a tapered portion, an expansible clamping sleeve positioned on said shaft and having a tapered bore fitting the tapered portion of the shaft, a cutter received on said sleeve, an outer sleeve supported on the clamping sleeve but spaced from the expanding portion thereof, and a feather-edger slidably mounted on the outer sleeve.

4. A machine of the class described having, in combination, a shaft provided with a tapered portion, a clamping sleeve positioned on said shaft and having a tapered bore fitting the tapered portion of the shaft, said sleeve being radially slitted for a portion of its length and having a plurality of exterior shoulders, a cutter received on the slitted portion of said sleeve, an outer sleeve closely surrounding a portion of the clamping sleeve and located between one of said shoulders thereon and said cutter, a feather-edger mounted to slide on said outer sleeve and means for rigidly clamping said shaft, clamping sleeve and cutter together.

5. A machine of the class described comprising, in combination, a shaft having a tapered portion near its forward end and a plurality of shoulders, a clamping sleeve positioned on said shaft and provided with a tapered bore fitting the tapered portion of the shaft, said sleeve being radially slitted for a portion of its length and having a series of exterior shoulders decreasing in diameter as they progress forwardly, a cutter mounted on the slitted portion of said sleeve, an outer sleeve closely surrounding a portion of the clamping sleeve and received between said cutter and the rearmost shoulder on said clamping sleeve, a feather-edger slidably mounted on said outer sleeve, a spring pressing said feather-edger forward, a vamp guard on the end of said shaft and a bolt bearing against said guard and clamping the shaft, cutter and clamping sleeve rigidly together.

6. A device of the character described comprising, in combination, a shaft provided with a tapered portion, an expansible clamping sleeve concentrically positioned on said shaft, an outer sleeve concentrically mounted on said clamping sleeve and abutting against the rear portion of said clamping sleeve but spaced from the forward portion thereof, a feather-edger mounted on said outer sleeve, a cutter positioned on said clamping sleeve and abutting against the forward end of said outer sleeve and means for forcing said cutter longitudinally of said shaft whereby said shaft, clamping sleeve and cutter are rigidly clamped together.

7. A machine of the class described having, in combination, a rotatable shaft, a cutter, means including an expansible member for securing the cutter on the shaft, a feather-edger coöperating with said cutter and a support on which said feather-edger is movably mounted, said support being mounted directly on a portion of said expansible member.

In testimony whereof I have signed my name to this specification in the presence of two subscribing witnesses.

ALBERT LATHAM.

Witnesses:
LEONARD M. JOHNSON,
JOHN H. McCREADY.